United States Patent [19]
Dao Trong et al.

[11] Patent Number: 5,875,123
[45] Date of Patent: Feb. 23, 1999

[54] CARRY-SELECT ADDER WITH PRE-COUNTING OF LEADING ZERO DIGITS

[75] Inventors: Son Dao Trong, Stuttgart; Günter Gerwig, Simmozheim; Klaus Getzlaff, Schönaich; Wilhelm Haller, Remshalden, all of Germany

[73] Assignee: International Business Machines Corporation, Armonk, N.Y.

[21] Appl. No.: 765,419

[22] PCT Filed: Apr. 18, 1995

[86] PCT No.: PCT/EP95/01455

§ 371 Date: May 13, 1997

§ 102(e) Date: May 13, 1997

[87] PCT Pub. No.: WO96/33456

PCT Pub. Date: Oct. 24, 1996

[51] Int. Cl.⁶ .................. G06F 7/42; G06F 7/00
[52] U.S. Cl. .................. 364/748.11; 364/715.04
[58] Field of Search .............. 364/715.04, 715.011, 364/748.11, 788

[56] References Cited

U.S. PATENT DOCUMENTS

| | | | |
|---|---|---|---|
| 4,926,369 | 5/1990 | Hokenek et al. | 364/715.04 |
| 5,204,825 | 4/1993 | Ng | 364/715.04 |
| 5,317,527 | 5/1994 | Britton et al. | 364/715.04 |
| 5,424,968 | 6/1995 | Okamoto | 364/715.04 |
| 5,493,520 | 2/1996 | Schmookler et al. | 364/715.04 |
| 5,732,007 | 3/1998 | Grushin et al. | 364/715.04 |

OTHER PUBLICATIONS

Hokenek et al., "Leading–zero anticipator (LZA) in the IBM RISC System/600 floating–point execution unit", IBM J. Res Dev. vol. 34 No. 1, Jan. 1990, pp. 71–77.

Suzuki et al, "A 2.4–ns, 16–bit, 0.5–um CMOS arithmetic logic unit for microprogrammable video signal processor LSIs", May 9, 1993, Proceedings of the custom integrated circuits conference, San Diego, pp. 12.04.01–12.04.04, IEEE.

*Primary Examiner*—Tan V. Mai
*Attorney, Agent, or Firm*—Marc A. Ehrlich

[57] ABSTRACT

A method and apparatus for the determination of leading zero digits of a sum is presented herein. The technique incorporates the parallel determination of partial sums of single digits accounting for the possibility of carries and on the basis thereof the pre-determination of potential zero digits or potential leading zero digits. Upon the establishment of a correct partial sum, the potential zero digits are selected and evaluated thereby determining the leading zero digits. The invention may be implemented in an adder in parallel or via a hierarchical structure. The parallelism permits time-savings in the determination of a normalized sum. The invention is preferably incorporated into adders, floating point computing units and/or data processing units.

17 Claims, 12 Drawing Sheets

CARRY-SELECT ADDER WITH PRE-COUNTING OF LEADING ZERO DIGITS

FIELD OF INVENTION

This invention relates to ascertaining the leading zero digits of a sum, in particular in Carry-Select-Adders.

PRIOR ART

For a quick addition today mainly parallel working adders consisting of a plurality of individual parallel working digital adding units connected with one another are used. The digits of the same digit significance of the operands to be added are processed simultaneously and thereby as quickly as possible. The time overhead of an addition is shortened under the penalty of the hardware requirements, in particular the space overhead (chip area). Digit in writing a number means the place where a certain figure is positioned. Digits of identical significance are digits written at the same position in front of or behind the decimal point of numbers of the same power.

Parallel adders consist frequently of a plurality of parallel, individual Carry-Select-Adders as known in Prior Art. Each individual adder adds up the digits of the same significance of the operands to be added to make an individual or partial sum. Since it is not yet sure at the time of adding the individual digits owing to the parallel adding, which of said digits must take into account a carry from the prior digit, each individual adder finds the result of the partial sum of one respective digit both with and without the consideration of a carry. Not before the completion of said parallel individual addition it is certain which of the digits will have to take a carry into account, and with the help of the respective carry now the correct result of each individual digit addition, meaning with or without carry, is determined. In other words, each partial adder calculates both a partial sum with a carry and a partial sum without a carry. The correct value of the partial sum within the total addition is subsequently "selected" by means of the found carry—therefrom derives the name of "Carry-Select-Adder".

In floating point processors, two floating point operands are added to one another. For the addition of the floating point numbers, initially the exponents of the two operands are assimilated to one another (alignment), so that subsequently the two operands show the same exponent.

Example

Operand $A = +0.11864 \times 10^5$

Operand $B = -0.96591 \times 10^4$ aligned:

Operand $A = +0.11864 \times 10^5$

Operand $B = -0.09659 \times 10^5$

Next the mantissae of the two aligned operands are added to one another:

$$\begin{array}{rrl} \text{Operand} & A = & +0.11864 \times 10^5 \\ +\ \text{Operand} & B = & -0.09659 \times 10^5 \\ \hline \text{Sum} & S = & +0.02205 \times 10^5 \end{array}$$

In doing so, a not predeterminable number of leading zeroes (zero digits) may appear. The result must be normalised, meaning, the leading zero digits must be counted, the mantissa must be shifted towards the left in accordance with the leading zero digits, and the number of leading zero digits must be subtracted from the exponent.

Sum $S = +0.02205 \times 10^5 \rightarrow 1$ leading zero digit.

Shift the mantissa

↓ ↓,

Correct the exponent

Sum $S = +0.2205 \times 10^4$

In the adders as known in Prior Art at first the sum of the mantissae of the operands as aligned with one another is calculated. From said sum the number of leading zero digits is determined in a subsequent step and the sum is normalised in conformity with such leading zero digits. Such process of counting leading zero digits is, however, still more critical as to time consumption during the run of a cycle than the result of the mantissa addition, thus slowing down the overall adding process.

Figure 1:
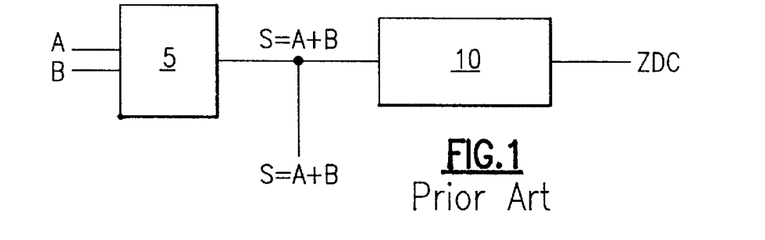
FIG. 1 shows an adder in accordance with Prior Art.

FIG. 1 shows an adder 5 in accordance with Prior Art. The two operands A and B are added up to a sum S=A+B in the adder 5, and said sum S is placed by the adder 5 at its output. A counter 10 finds the number of leading zero digits of the sum S and outputs same as a value ZDC (Zero Digit Count). The mantissa of the sum S is shifted to the left in accordance with the number of the leading zero digits ZDC, and the number of the leading zero digits ZDC is subtracted from the exponent of the sum.

SUMMARY OF THE INVENTION

It is an object of the invention to provide an adder which allows a quicker finding of a normalised sum.

It is another object of the invention to provide an adder which allows a quicker finding of the number of the leading zero digits of a sum. Thereby, two floating point figures may quicker be added.

The objects of the invention are solved by devices and methods as described in the independent claims.

The invention allows the finding of the leading zero digits of the sum of an addition approximately in the same period of time as the finding of the sum. That is done by a process carried out in parallel with the finding of partial sums of the various digits taking into account carries, if any, and, on the basis of same, a pre-establishment of potential zero digits or also potential leading zero digits, respectively, which then are selected as soon as the correct value of a partial sum has been found, and are evaluated by a next following step, if required, resulting in the leading zero digits of the total sum.

The finding of the leading zero digits according to the invention, as provided in an adder, may be carried out either strictly in parallel, or parallel with a hierarchical, in each case self-similar structure of a device according to the invention. This allows an optimum parallel and respectively time-saving finding of the normalised sum.

The determination of the leading zero digits according to the invention is preferably used in adders, floating-point calculating units and/or in data processing facilities.

Further advantageous embodiments of the invention are found in the subclaims.

DESCRIPTION OF THE DRAWINGS

For a closer explanation of the invention, embodiments are described in the following taking reference to the accompanying drawings. Elements of equal function are to be marked with the same references.

FIGS. 5A–5C, shows a binary adder for the example of the 16+16 adder, FIG. 6, comprising FIGS. 6A–6B, shows a binary adder for the example of the 64+64 adder, FIG. 7, comprising FIGS. 7A–7C, shows a partial adder block of FIG. 6.

GENERAL DESCRIPTION OF THE INVENTION

Figure 2:
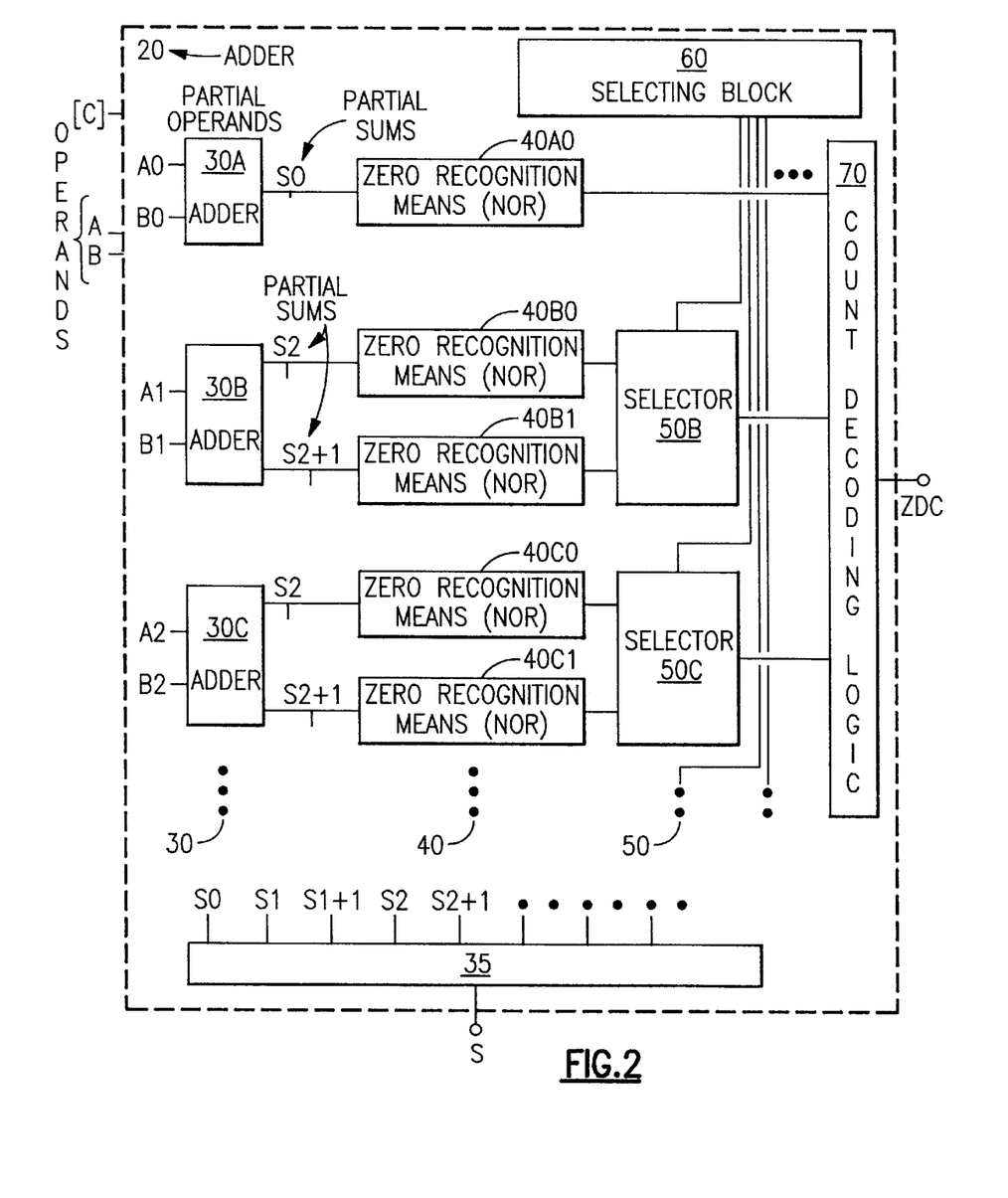
FIG. 2 shows an adder in accordance with the invention.

FIG. 2 shows an adder 20 according to the invention in which already the finding of leading zero digits takes place substantially in parallel with the finding of the total sum. The adder 20 consists of a plurality of adders 30A, 30B, 30C etc. switched in parallel, which add up the partial operands A0, A1, A2 etc. and B0, B1, B2 etc. of the operands A and B respectively to make the partial sums S0, S1 and S2 respectively. Each one of the adders 30A, 30B and 30C adds up one of the digits of the operands A and B of the same digit position, each digit possibly consisting of a plurality of bits or lines. In the case of a hexadecimal addition, each one hex digit would consist of 4 bit lines.

Input of the adder 30A are the least significant digits A0 and B0 of the operands A and B respectively, whereas the inputs of the adders 30B, 30C etc. are the more significant digits of the operands A and B. As described above already, in each digit position there may occur a carry which must be taken into account during the addition of the next higher significant digit. In order to warrant the parallelism of the individual additions, each one of the more significant adders 30B, 30C etc. finds, in addition to the sums S1, S2 etc. of the respective digit addition, also a sum (S1+1), (S2+1) for taking into account also a possible carry from a preceding digit position. The least significant adder 30A outputs the sum S0 whereas the more significant adders 30B, 30C etc. output both the sums S1, S2 etc. and the sums (S1+1), (S2+1) etc. respectively.

Each one of the found partial sums S0, S1, S2 etc. as well as the partial sums (S1+1), (S2+1) taking into account a possible carry, will be fed to a subsequent stage 35, as such here not further explained and sufficiently known in the Art, for calculating the overall sum S. In parallel therewith said partial sums, both with and also without considering a carry, are fed each to an OR gate with negated output (NOR) 40. Each one of said NOR gates 40 outputs a logic '1' if the respective incoming sum S0, S1, S2 etc. or the sum taking into account a carry (S1+1), (S2+1) etc., equals zero. If e.g. a hexadecimal coding of the digits is selected, each one of the sums consists of 4 bit lines which are each the input into one of the NOR gates respectively.

The outputs of the NOR gates 40 for one of the higher significant adder 30B, 30C etc. each are fed to a selector 50B, 50C etc. each. So the outputs of the NOR gates 40B0 and 40B1 of the adder 30B are fed to selector 50B, the outputs of the NOR gates 40C0 and 40C1 of the adder 30C are fed to the selector 50C. Each one of the selectors 50B, 50C etc. serves for selecting whether the sums S1, S2 etc. or the sums S1+1, S2+1 etc. must be used. Said selectors 50 are controlled by means of a selecting block 60 as usual for the carry-select adding procedure for selecting the respective correct partial sum.

The output of the NOR gate 40A0 of the least significant digit and the outputs of the selectors 50 of the higher significant digits serve for inputs to a count decoding logic 70. The count decoding logic 70 finds therefrom the number of the leading zero digits ZDC of the overall result S of the addition of the operands A and B and places same at its output. This happens preferably by the conversion of Boolean equations which result from a truth table which represents the various combination possibilities of the input signals—here the information whether or not a single digit is a zero digit—and their conversion into the wanted output signals—here the number of the leading zero digits ZDC. Said Boolean equations are transformed into the respective circuit (hardware) combinations (see the following examples in this respect).

The ZDC is output by the count decoding logic 70 preferably by means of a decoding table. The ZDC represents then the binary coded value of the number of the leading zeroes of the sum S. In case of a sum S having 4 digits, this results in 2 binary bits, in case of 8 digits, in 3 binary bits etc.

By means of the adder of the invention according to FIG. 2, the numbers of the leading zero digits are therefore not determined from the overall sum S of the operands A and B but already from the partial sums S0, S1, S2 etc. of the respective partial additions of the same digits positions each. This allows, according to the invention, the determining of the number of leading zeroes ZDC approximately at the same time with the overall sum S, depending in particular on the adder width and on the digital significance of the respective ZDC bit. The overall sum S can subsequently be normalised immediately, meaning that the leading zero digits may be removed.

Said property of the approximately simultaneous determination of the number of the leading zeroes ZDC with the determination of the overall sum S is advantageous e.g. in an application in quick floating-point calculation units in which the addition is to be completed preferably within one clock period. In the remaining part of the clock period, the number of leading zero digits ZDC may be used for carrying through the normalisation of the floating-point calculation operation. Therefor the ZDC must be subtracted from the exponent of the sum S, or the sum S must be shifted towards the left by the ZDC amount. Also in cases in which the normalisation is carried out wholly or partially in the subsequent clock (depending on a present pipeline structure), it is an advantage if the ZDC is known as early as possible. In both cases a shortening of the clock period is possible.

Figure 3:
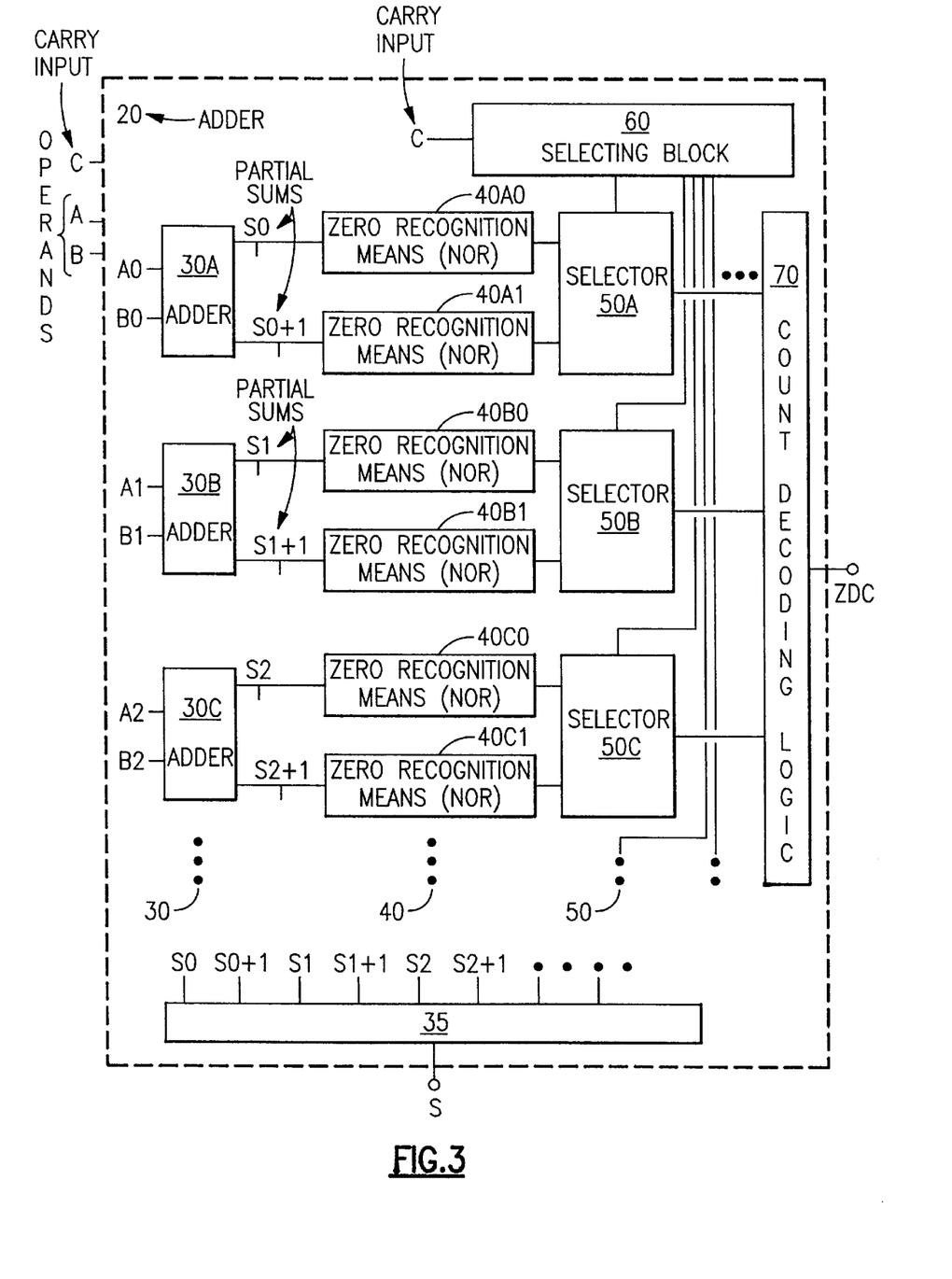
FIG. 3 shows an adder in accordance with FIG. 2 which has an input of a carry C besides the inputs of the two operands A and B.

Frequently in case of an adder according to FIG. 2 another carry C must be taken into account, e.g. from a parallel adder with lower significant digits. FIG. 3 shows an adder in accordance with FIG. 2 which is provided, besides the two operands A and B, also with a carry C as input. The adder 20 in accordance with FIG. 3 comprises, in addition to the respective components of the adder 20 in accordance with FIG. 2, another output of the least significant digit for the adder 30A, said further output providing a sum (S0+1), and another NOR gate 40A1 connected therewith, and another selector 50A connected with the two NOR gates 40A0 and 40A1. The carry C to be taken into account will be fed to the input of the selection block 60. As will be seen from FIG. 3, in such embodiment the design of the adders 30, NOR gates 40 and selectors 50 for each digit is accordingly built up.

Here must be understood that the arrangement, as chosen in FIGS. 2 and 3, of the NOR gates 40 and the selectors 50, in this order, first the NOR gate 40 and then the selector 50, is not mandatory, however has the most propitious properties as regards the time behaviour of the signals. Since the selection signals of the selecting block 60 can be generated with a certain time delay only, the sums S0, S0+1, S1, S1+1, etc. are, however, frequently available already prior to said selection signals, the required recognition of a respective zero digit by the respective NOR gates 40 may preferably be made already before the selection by the selectors 50 as shown in FIGS. 2 and 3.

Furthermore, it must be understood that the invention is not restricted to the use of NOR gates 40. Also any kind of recognition means 40 for zero digits may be used instead, for determining if the respective partial sum waiting at the respective output represents a zero digit. Thus, e.g. in a reverted logic an AND gate with inversion (NAND) may be used.

In large-width adders e.g. a 16 digit adder, each digit representing e.g. a hexadecimal value of 4 bits each, i.e. altogether a 64 bit adder 20, it is frequently not reasonable to use one adder 20 only, e.g. in accordance with FIG. 2 or 3, having 16 adder units. This is results from the fact that a final carry to a digit will become available relatively late in the sequence of time. In order to be able to apply the count decoding logic after receipt of the final carries as soon as possible (i.e. using as few logical steps as possible) the time before will have to be utilised for carrying out a pre-decoding step.

More advantageous in the case of large width adders, e.g. 8 digits and more, is a preferable hierarchic distribution into a plurality of parallel partial adders with the respective determination of leading zero digits in one of said partial adders, and a downstream total count decoding logic for the final determination of the leading zero digits ZDC of the overall sum. The function of block 70 is in such case subdivided into a pre-decoding and a final decoding. Thereby the final decoding may be carried out quicker, whereas the pre-decoding works during a time interval which is required for determining the Carry-in signals anyway. Pre-decoding therefore does not consume additional time. Said pre-decoding is distributed to the respective partial adding blocks and must be made there twice. The actual pre-decoding signals are then selected by the Carry-in for the respective partial adder block.

Figure 4:
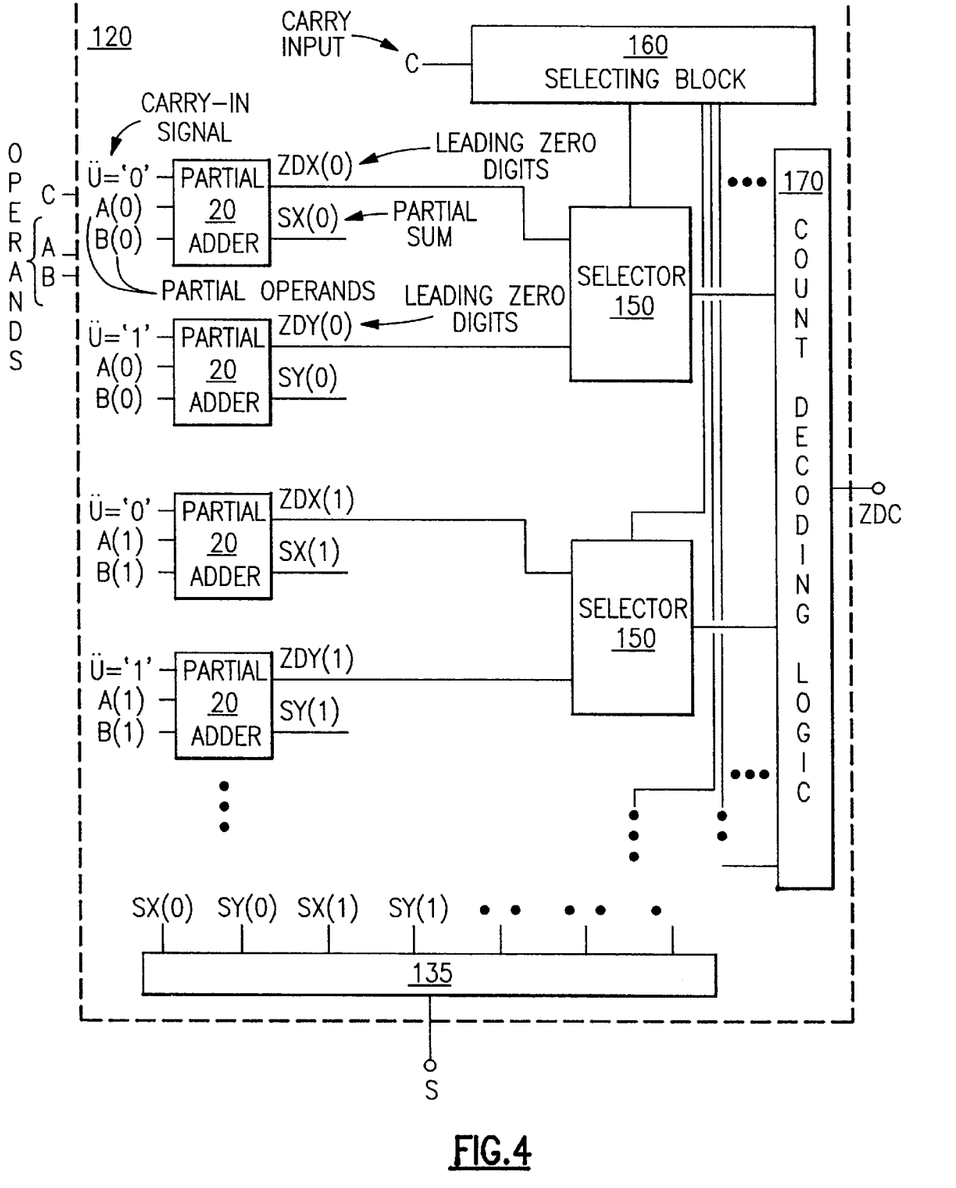
FIG. 4 shows the design of an adder with a large number of digits and a partitioning into a plurality of parallel partial adders, FIG. 5, comprising

FIG. 4 shows the design of an adder 120 with a large digit-width and a subdivision into a plurality of parallel partial adders. Inputs of the adder 120 are, in addition to the operands A and B, also an optional Carry-in input C, and as outputs the sum S=A+B and the number of leading zero digits ZDC. The operands A and B are subdivided into a number of partial operands A(0) and B(0), A(1) and B(1), A(2) and B(2) etc. representing each a plurality of individual digits.

The adder 120 comprises a plurality of parallel partial adders 20, the inputs of two partial adders 20 each being partial operands A(0) and B(0), A(1) and B(1), A(2) and B(2) of the same digit positions each. Furthermore, one partial adder 20 of each of the same digit position partial adder pairs will get a carry-in signal $\ddot{U}$ whereas the other partial adder 20 of said pair does dot get a carry-in signal. On receipt of the optional carry C, all partial adders 20 are built up according to FIG. 3.

Each one of the partial adders 20 with a carry-in signal $\ddot{U}$='0' determines from its respective inputs A(0) and B(0), A(1) and B(1), A(2) and B(2) etc. a partial sum SX(0), SX(1), SX(2) etc. and the number of the leading zero digits ZDX(0), ZDX(1), ZDX(2) etc. of the respective partial sums SX(0), SX(1), SX(2) etc. as was described above. In analogy thereto, each of the partial adders 20 with the carry-in signal $\ddot{U}$='1' determines from its respective inputs A(0) and B(0), A(1) and B(1), A(2) and B(2) etc. and the carry-in signal $\ddot{U}$, a partial sum SY(0), SY(1), SY(2) etc. and the number of the leading zero digits ZDY(0), ZDY(1), ZDY(2) etc. of the respective partial sums SY(0), SY(1), SY(2) etc. as was described above.

The partial sums SX(0), SX(1), SX(2), SY(0), SY(1), SY(2) will be fed to a step 135 for determining the total sum S, sufficiently known in the Art and therefore here not further explained. Parallel thereto, the number of the leading zero digits, both with and without taking into account a carry-in signal, are fed to a selector 150 each for each one of the partial adder pairs. Each one of the selectors 150 serves for selecting, whether the number of the leading zero digits ZDX(0), ZDX(1), ZDX(2) etc. of the respective partial sums SX(0), SX(1), SX(2), etc., or the number of the leading zero digits ZDY(0), ZDY(1), ZDY(2) etc. of the respective partial sums SY(0), SY(1), SY(2) etc. are to be used. Such selectors 150 are controlled by a selector block 160 as usual in the case of carry-in selection adding.

The respective selected leading zero digits are fed to an overall count decoding logic 170 by the selectors 150. The overall count decoding logic 170 determines therefrom the number of the leading zero digits ZDC of the overall result S of the addition of the operands A and B and outputs said number of the leading zero digits ZDC. This is done in analogy to the method as explained for the count decoding logic 70.

Without said optional carry C, even a design in accordance with FIG. 2 is sufficient for the partial adder with the least significant digits, then no partial adder pair is required either but a single partial adder 20 only for the least significant digit. Also the respective selector 150 is eliminated in that case.

The hierarchical design of an adder according to FIG. 4 may now be shaped further in a recursive manner. In a next higher hierarchical step the adders 20 from FIG. 4 would be replaced by adders 120. Due to the repeated composition of lower integrated elements for generating higher integrated circuits, such as e.g. interconnections of adders 20 to make higher integrated adders 120, highly complex sequential circuits may be realised by continuation of the said self-similarity process, which allow a time-saving determination of the leading zero digits in the overall sum approximately parallel with the determination of said sum. The principal design remains thereby the same as shown in FIG. 4.

So, e.g., in a binary adder having 64 digits, as compared with an adder having 16 digits, one more hierarchical step is required. This can be continued, so that a supplementary hierarchical step must be introduced for each quadrupling of the adder width.

Here must be understood that, in a hierarchical, self-similar design of an adder, simplification and sharing possibilities may result from the implementation of the circuits. So, in realising, the respective partial adder pairs may be combined since parts of the said two adders may be shared. This will be seen also from the following examples.

DETAILED DESCRIPTION OF THE INVENTION

The following embodiments are to explain the invention along the pattern of a real design, without the invention being limited thereby. The chosen designation of the operands and values states the bit width in parentheses each, e.g. the operand A(0 . . . 63) will show here an example of a bit width of 0 to 63, i.e. 64 bits. In the embodiments, as opposed to the representation above, A(0) is the most significant bit and A(63) is the least significant bit.

In the example, at first a 16+16 bit adder according to the invention, and subsequently an adder having 64+64 bits is shown, however the invention is applicable also to adders of another data width (such as 32, 128, 256 etc.).

Figures 5, 5C:
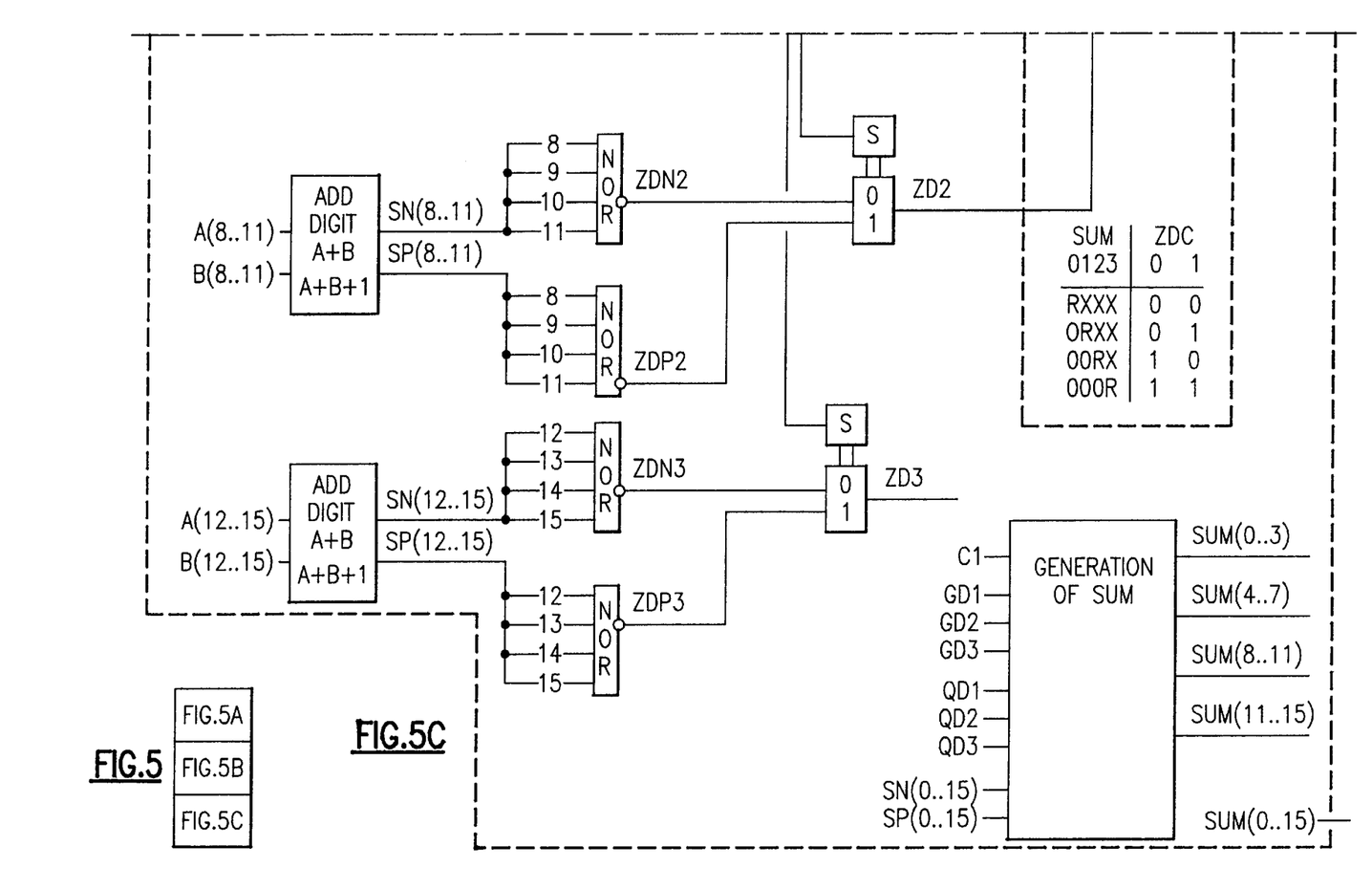
Figure 5A:
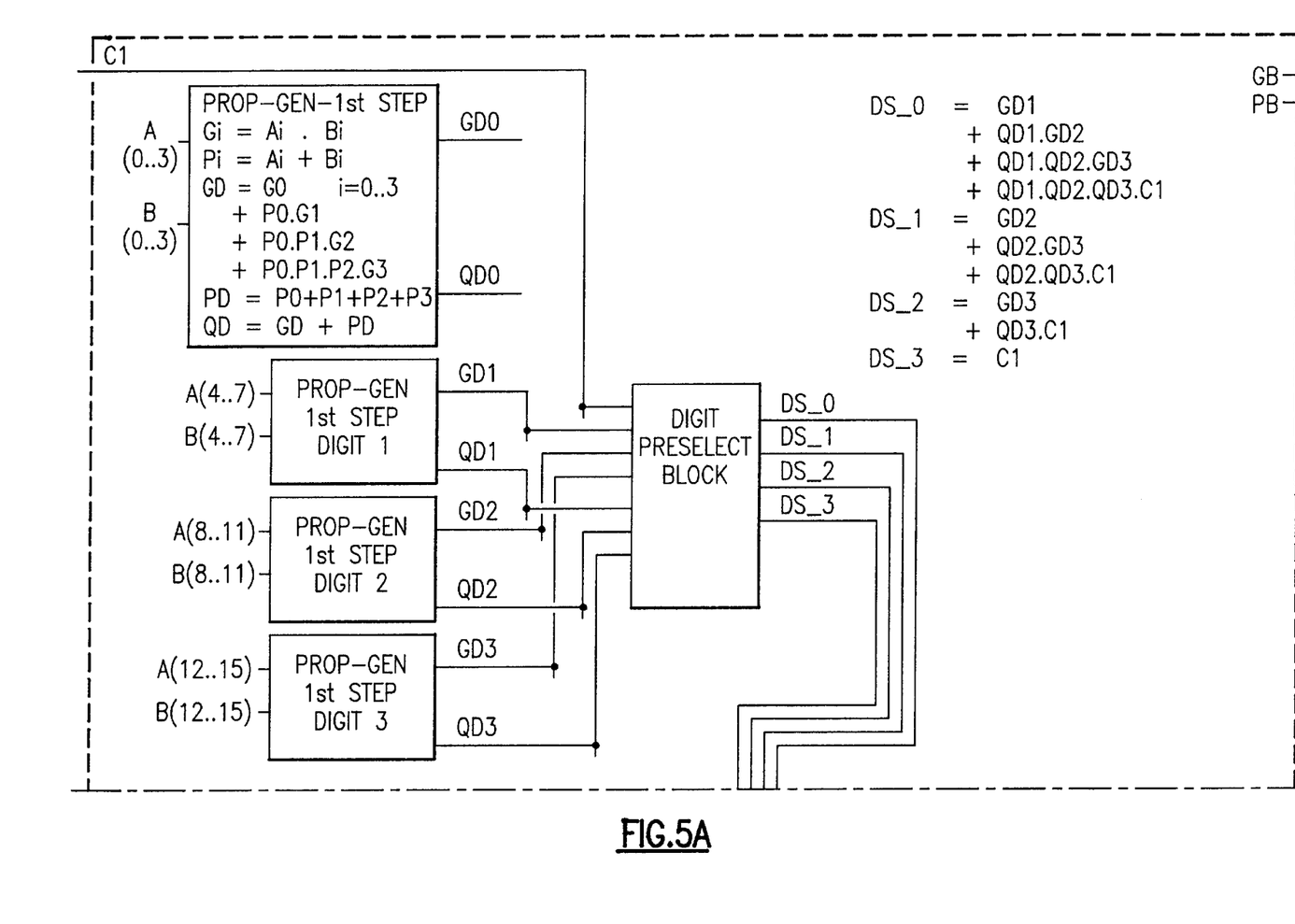
Figure 5B:
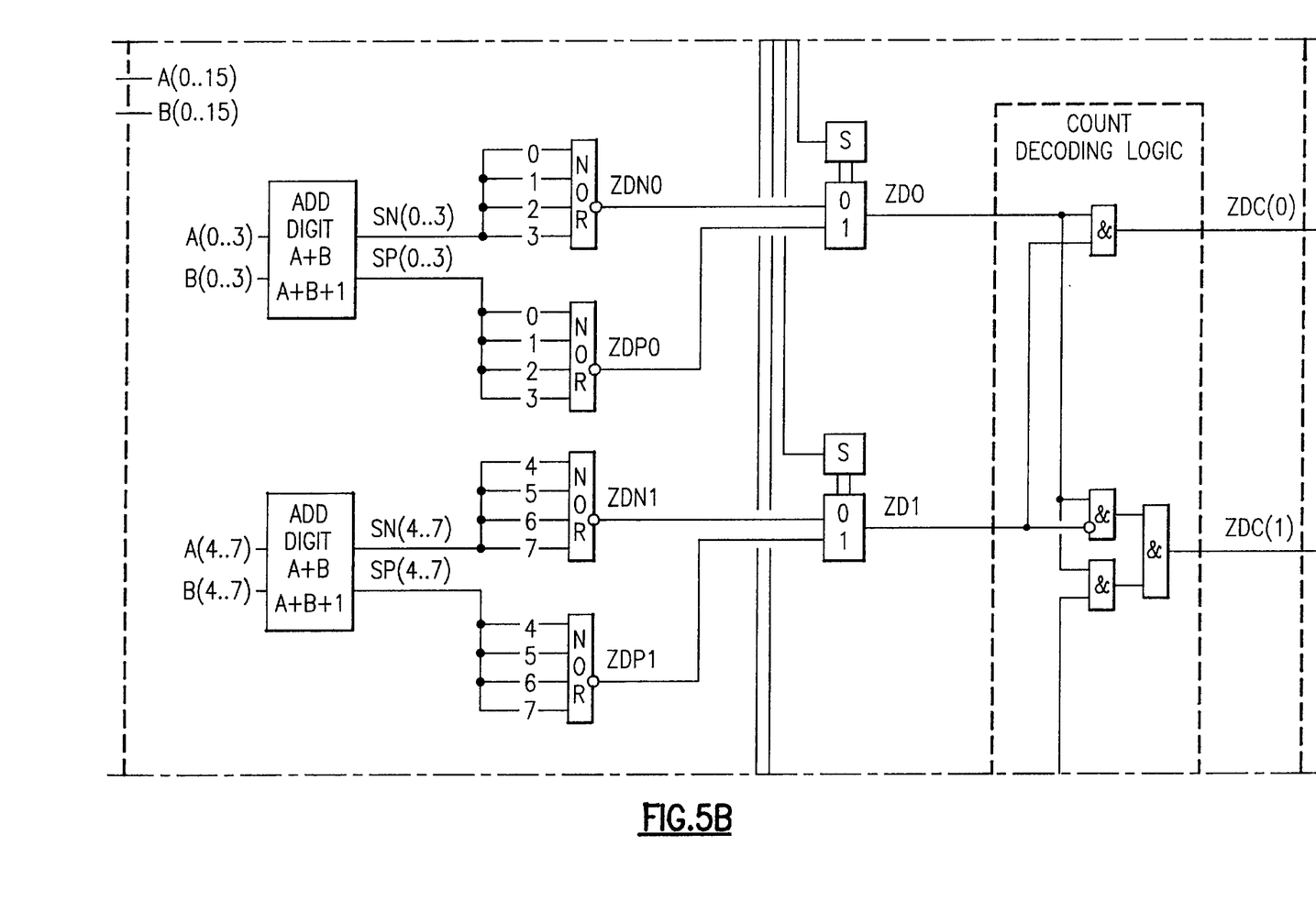

FIG. 5 shows a binary adder for the example of the 16+16 adder, having the input operands A(0 . . . 15) and B(0 . . . 15). The resulting operand SUM(0 . . . 15) represents the sum resulting from the operation A+B. In addition, the number of the leading zero digits ZDC(0 . . . 1) is determined. One digit consists of 4 bits and may assume the hexadecimal values {0, 1, 2, 3, 4, 5, 6, 7, 8, 9, A, B, C, D, E, F}. The sum consists of 16 bits i.e. 4 digits. The ZDC be binary coded, consists of 2 bits, and may assume the decimal values 0 through 4, corresponding to the hexadecimal values. In FIG. 5 there are represented:

| A(0 . . . 15) | Operand A | |
|---|---|---|
| B(0 . . . 15) | Operand B | |
| CI | Carry_In | for the adder as a whole |
| G | Generate | for single binary digits |
| P | Propagate | for single binary digits |
| GD | Generate | for Digit (4 bit) |
| PD | Propagate | for Digit (4 bit) |
| QD | Generate or Propagate | for Digit (4 bit) |
| SN | Sum Normal | without Carry-in (A + B) |
| SP | Sum Plus_1 | with Carry-in (A + B + 1) |
| ZDN | Zero Digit | without Carry-in (A + B) |
| ZDP | Zero Digit | with Carry-in (A + B + 1) |
| DS | Digit Select | for Digit |
| ZDC | Zero Digit Count | 'Counted Leading Zeroes' |

Table 1 shows the assignment of the ZDC bits depending on the sum:

| SUM | ZDC | |
|---|---|---|
| (hexadecimal digits) | (binary bits) | (decimal) |
| Rxxx | 0 0 | 0 |
| 0Rxx | 0 1 | 1 |
| 00Rx | 1 0 | 2 |
| 000R | 1 1 | 3 | with:
R: =digit having hexadecimal value {1, . . . F} not {0}
x: =indeterminate, arbitrary One more input into the adder in accordance with FIG. 5 is a Carry_In (CI) Signal. If this is valued (logically) '1', the sum A+B+1 will result. If CI='0', the sum is A+B. Also further outputs may be used which are not stated here (e.g. Carry Out, Result Zero, etc.).

The adder in accordance with FIG. 5 consists of 4 partial adder blocks which sum up 4+4 bits each and generate also pre-coded signals ZDN0, ZDN1, ZDN2, ZDN3, ZDP0, ZDP1, ZDP2, ZDP3 for determining the leading zero digits ZDC.

From said pre-coded ZDC signals, the output signals ZDC(0) and ZDC(1) are generated by a two-step logic. The respective Boolean equations are:

$$ZDC(0) = ZD0 \cdot ZD1$$

$$ZDC(1) = ZD0 \cdot {}^\wedge ZD2 + ZD0 \cdot ZD2$$

where:

. means AND
+ means OR
^ means NOT (inversion).

The count decoding logic of the 16 bit adder in FIG. 5 consists in this case of a logic AND for ZDC(0) and a two-step logic for ZDC(1), as shown in FIG. 5.

Figures 6, 6A:
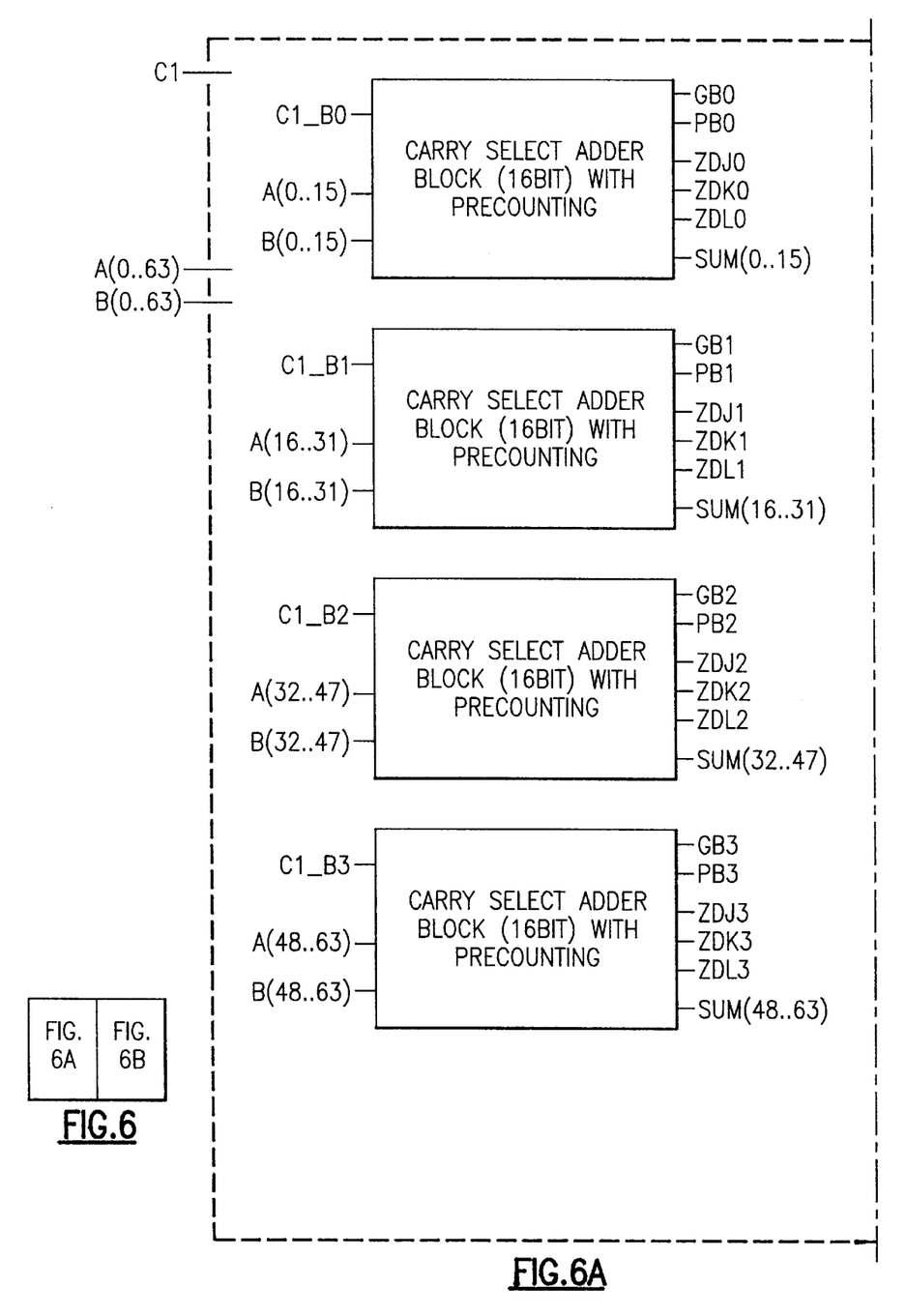
Figure 6B:
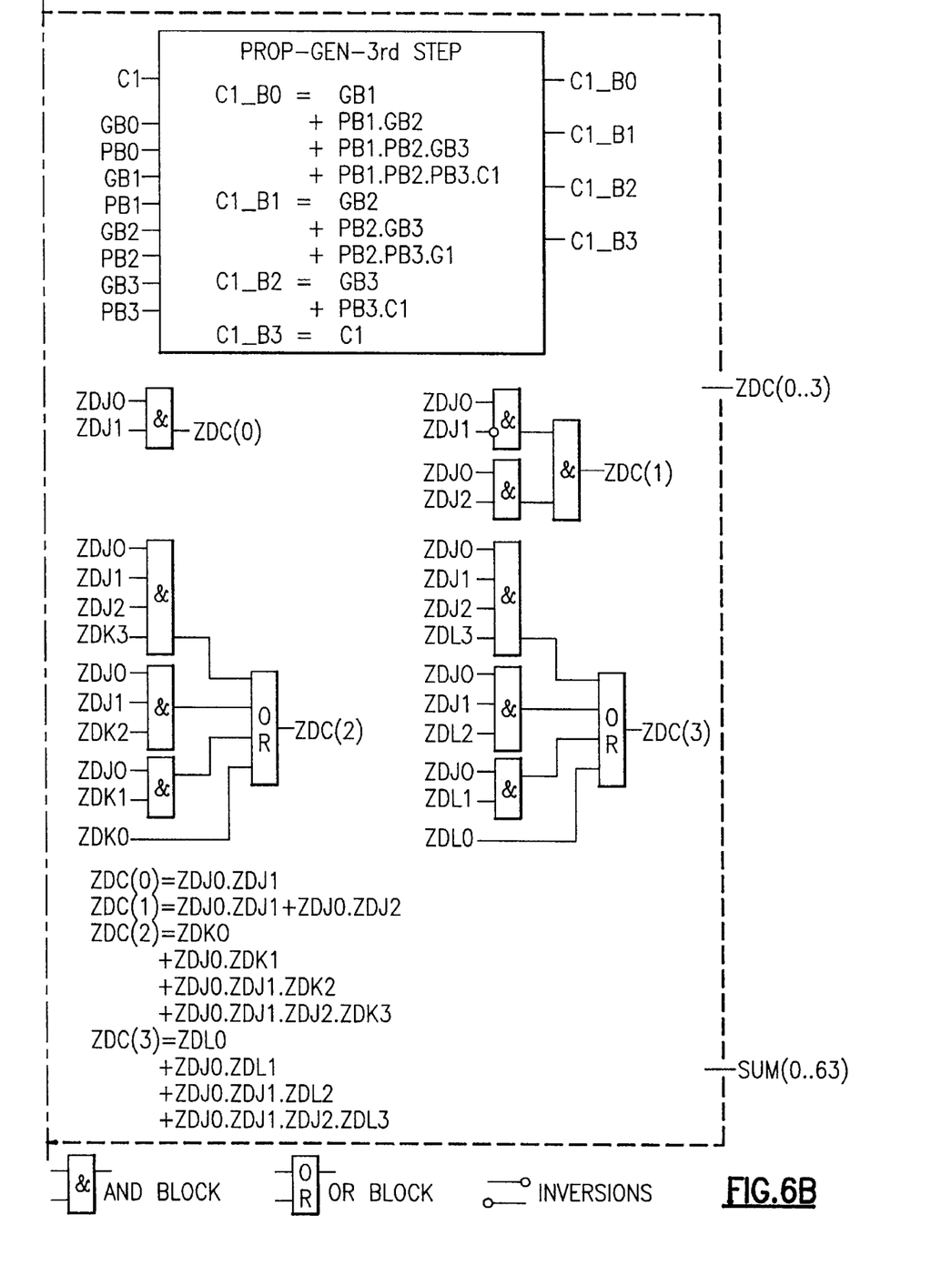

FIG. 6 shows, for the example of a 64+64 adder, a binary adder with the input operands A(0 . . . 63) and B(0 . . . 63). The result operand SUM(0 . . . 63) represents the sum of the operation A+B. In addition, the number of the leading zero digits ZDC(0 . . . 3) is determined. One digit consists of 4 bits and may assume the hexadecimal values of {0, 1, 2, 3, 4, 5, 6, 7, 8, 9, A, B, C, D, E, F}. The sum consists of 64 bits i.e. 16 digits. The ZDC be binary coded, consists of 4 bits, and may assume the decimal values 0 through 15, corresponding to the hexadecimal values.

In FIG. 6 there are represented:

| A(0 . . . 63) | Operand A | |
|---|---|---|
| B(0 . . . 63) | Operand B | |
| CI | Carry_In | for adder as a whole |
| CI_B | Carry_In Block | for 16 bit block (4 digit) |
| GB | Generate Block | for 16 bit block (4 digit) |
| PB | Propagate Block | for 16 bit block (4 digit) |
| ZDJ | Pre-counted Zero Digit | 4 zero digits in 16 bit block |
| ZDK | Pre-counted Zero Digit | 1 or 3 zero digits in block |
| ZDL | Pre-counted Zero Digit | 2 or 3 zero digits in block |
| SUM(0 . . . 63) | Sum | |

Table 2 shows the assignment of the ZDC bits depending on the sum:

| SUM | ZDC | |
|---|---|---|
| (hexadecimal digits) | (binary bits) | (decimal) |
| Rxxx xxxx xxxx xxxx | 0 0 0 0 | 0 |
| 0Rxx xxxx xxxx xxxx | 0 0 0 1 | 1 |
| 00Rx xxxx xxxx xxxx | 0 0 1 0 | 2 |
| 000R xxxx xxxx xxxx | 0 0 1 1 | 3 |
| 0000 Rxxx xxxx xxxx | 0 1 0 0 | 4 |
| 0000 0Rxx xxxx xxxx | 0 1 0 1 | 5 |
| 0000 00Rx xxxx xxxx | 0 1 1 0 | 6 |
| 0000 000R xxxx xxxx | 0 1 1 1 | 7 |
| 0000 0000 Rxxx xxxx | 1 0 0 0 | 8 |
| 0000 0000 0Rxx xxxx | 1 0 0 1 | 9 |
| 0000 0000 00Rx xxxx | 1 0 1 0 | 10 |
| 0000 0000 000R xxxx | 1 0 1 1 | 11 |
| 0000 0000 0000 Rxxx | 1 1 0 0 | 12 |
| 0000 0000 0000 0Rxx | 1 1 0 1 | 13 |
| 0000 0000 0000 00Rx | 1 1 1 0 | 14 |
| 0000 0000 0000 000R | 1 1 1 1 | 15 |
| 0000 0000 0000 0000 | x x x x | 16 | with:
R: =digit having hexadecimal value {1, . . . F} not {0}
x: =indeterminate, arbitrary One more input into the adder in accordance with FIG. 6 is a Carry_In (CI) Signal. If this is valued (logically) '1', the sum A+B+1 will result. If CI='0', the sum is A+B. Also further outputs may be used which are not stated here (e.g. Carry Out, Result Zero, etc.).

Figures 7, 7C:
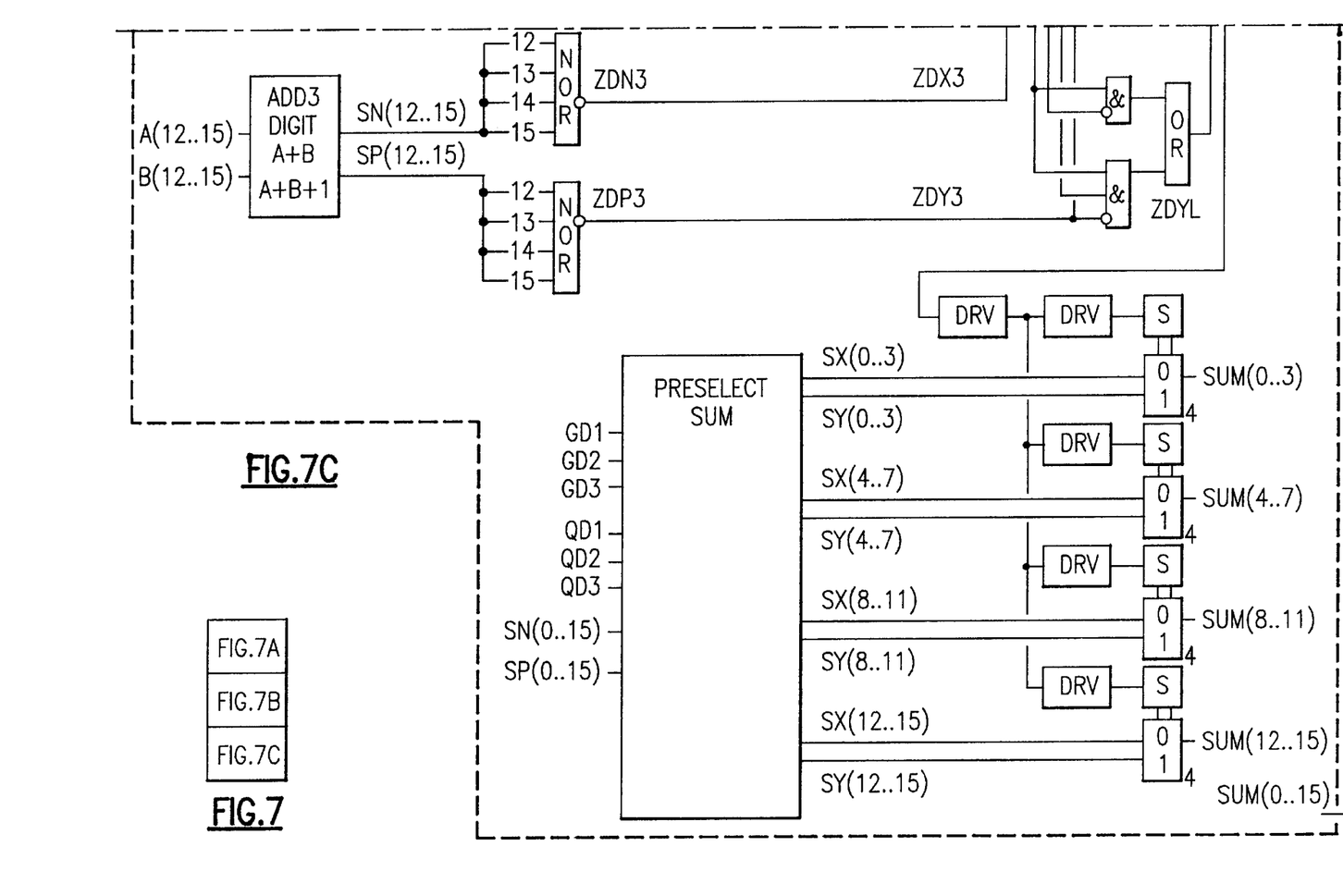
Figure 7A:
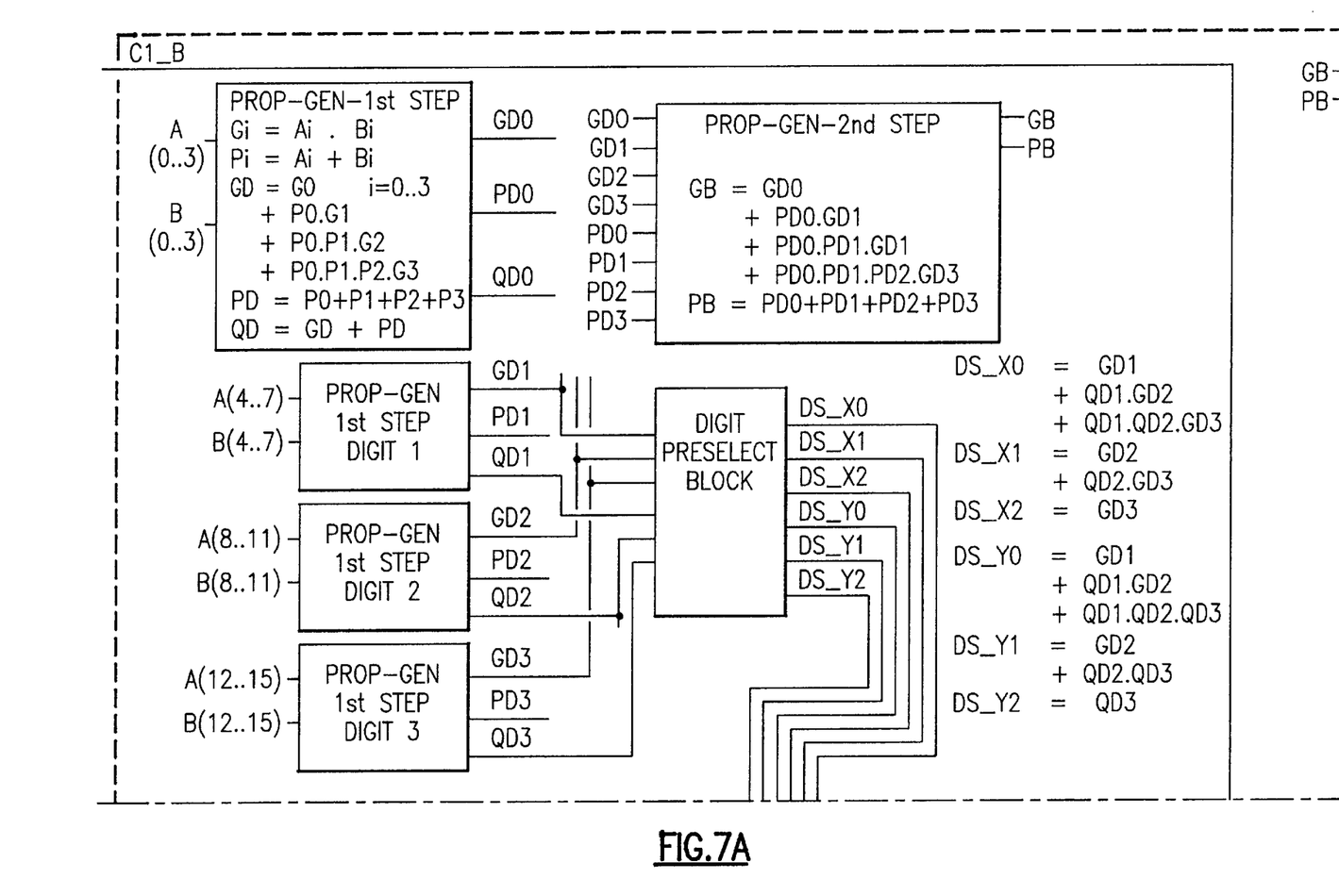
Figure 7B:
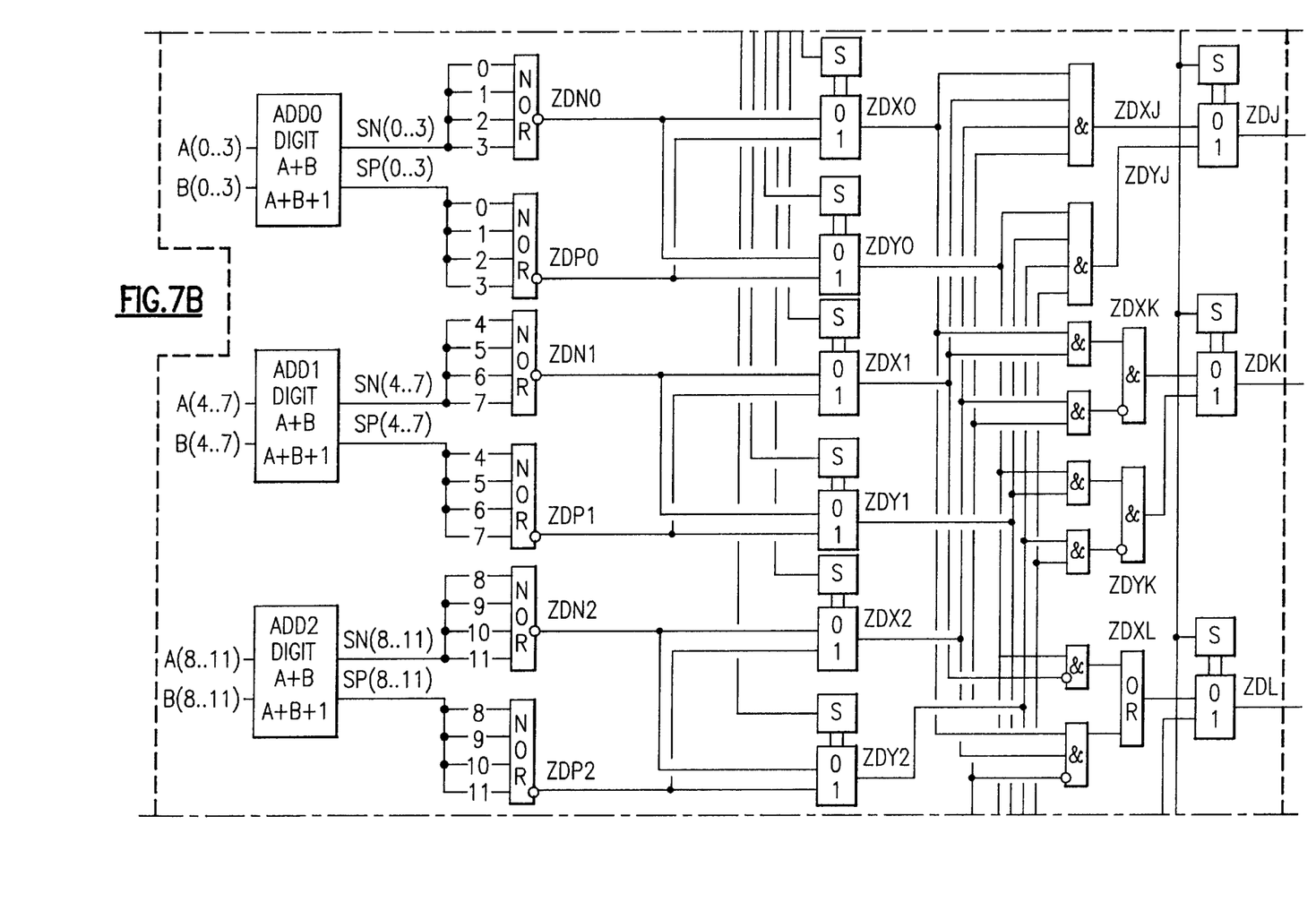

The adder in accordance with FIG. 6 consists of 4 partial adder blocks which sum up 16+16 bits each and generate also pre-coded signals ZDJ0, ZDJ1, ZDJ2, ZDJ3, ZDK0, ZDK1, ZDK2, ZDK3, ZDL0, ZDL1, ZDL2, ZDL3 for determining the leading zero digits ZDC. Such partial adder block is shown in FIG. 7.

From said pre-coded ZDC signals, the output signals ZDC(0), ZDC(1), ZDC(2) and ZDC(3) are generated by a two-step logic. The respective Boolean equations are:

```
ZDC(0) =    ZDJ0 . ZDJ1
ZDC(1) =    ZDJ0 .¯ZDJ1 + ZDJ0 . ZDJ2
ZDC(2) =    ZDK0
          + ZDJ0 . ZDK1
          + ZDJ0 . ZDJ1 . ZDK2
          + ZDJ0 . ZDJ1 . ZDJ2 . ZDK3
ZDC(3) =    ZDL0
          + ZDJ0 . ZDL1
          + ZDJ0 . ZDJ1 . ZDL2
          + ZDJ0 . ZDJ1 . ZDJ2 . ZDL3
```

The partial adder blocks contain also Generate and Propagate Signal outputs GB0, GB1, GB2, GB3, PB0, PB1, PB2, PB3, as usual in the use of Carry Select Adders. Such Generate and Propagate Signals are combined in Prop-Gen 3rd Step and the Carry-In Signals CI_B0, CI_B1, CI_B2, CI_B3 for the respective partial adder block are generated therefrom.

The Carry-In Signal after the partial adder block 0 is identical with the Carry-In CI of the overall adder. The Boolean equations for the Carry-In Signals of the respective partial adder blocks are:

```
CI_B0    :=    GB1
               +PB1.GB2
               +PB1.PB2.GB3
               +PB1.PB2.PB3.CI
CI_B1    :=    GB2
               +PB2.GB3
               +PB2.PB3.CI
CI_B2    :=    GB3
               +PB3.CI
CI_B3    :=    CI
```

This logic connection is realisable in 2-step logic.

FIG. 7 shows a partial adder block of the example according to the invention. It has the operand inputs A(0 .. . 15) and B(0 . . . 15) and the carry-In input CI_B which is generated by the Main-Prop-Generate block. In FIG. 7 show:

| | | |
|---|---|---|
| G | Generate | for single binary digits |
| P | Propagate | for single binary digits |
| GD | Generate | for Digit (4 bit) |
| PD | Propagate | for Digit (4 bit) |
| QD | Generate or Propagate | for Digit (4 bit) |
| SN | Sum Normal | without Carry-in (A + B) |
| SP | Sum Plus_1 | with Carry-in (A + B + 1) |
| SX | Sum | in case CI_B=0 |
| SY | Sum | in case CI_B=1 |
| ZDN | Zero Digit | without Carry-in (A + B) |
| ZDP | Zero Digit | with Carry-in (A + B + 1) |
| ZDX | Zero Digit | in case CI_B=0 |
| ZDY | Zero Digit | in case CI_B=1 |
| DS_X | Digit Select | for Digit in case CI_B=0 |
| DS_Y | Digit select | for Digit in case CI_B=1 |
| ZDJ | Pre-counted Zero Digit | 4 zero digits in 16 bit block |
| ZDK | Pre-counted Zero Digit | 1 or 3 zero digits in block |
| ZDL | Pre-counted Zero Digit | 2 or 3 zero digits in block |

As output, the partial adder block provides the signals GB and PB, the sum SUM(0 . . . 15) and signals which represent the number of pre-counted leading zero digits: ZDJ, ZDK and ZDL. Since the Carry-In signal CI_B is not yet available in time, at first the potential signals DS_X0, DS_X1, DS_X2 (for the case CI_B=0) and DS_Y0, DS_Y1, DS_Y2 (for the case CI_B=1) are generated. This is done in the pre-select block.

From the potential sums SN (SUM Normal: A+B) and SP (SUM plus_1: A+B+1) at first the potential zero digits, ZDN0, ZDN1, ZDN2, ZDN3 (from sum SN: A+B) and ZDP0, ZDP1, ZDP2, ZDP3 (from sum SP: A+B+1) are generated. Therefor a simple NOR connection having 4 inputs, as shown in FIG. 7, is sufficient. With the select signals DS_Xi and DS_Yi (i=0,1,2) then the ZDC signals ZDX0, ZDX1, ZDX2, ZDX3 (for the case CI_B=0) and ZDY0, ZDY1, ZDY2, ZDY3 (for the case CI_B=1) are generated.

From such signals, the signals ZDXJ, ZDXK, ZDXL (for the case CI_B=0), and ZDYJ, ZDYK, ZDYL (for the case CI_B=1) are generated using the logic shown in FIG. 7. Such signals are "precoded", in order to make the later generation of the ZDC as simple as possible. Thereupon the 'Precounted Zero Digit' signals ZDJ, ZDK and ZDL are selected by means of the Carry-In signal CI_B.

ZDJ is active (='1') when all four digits in the 16 bit block are zero. ZDK is active when the most significant or the three most significant digits are zero.

The blocks PROP-GEN-1st STEP, PROP-GEN-2nd STEP, ADD-DIGIT and PRESELECT SUM correspond to Prior Art for a Carry-Select Adder. The logic in connection with ZDC is, however, part of the invention.

Figure 8:
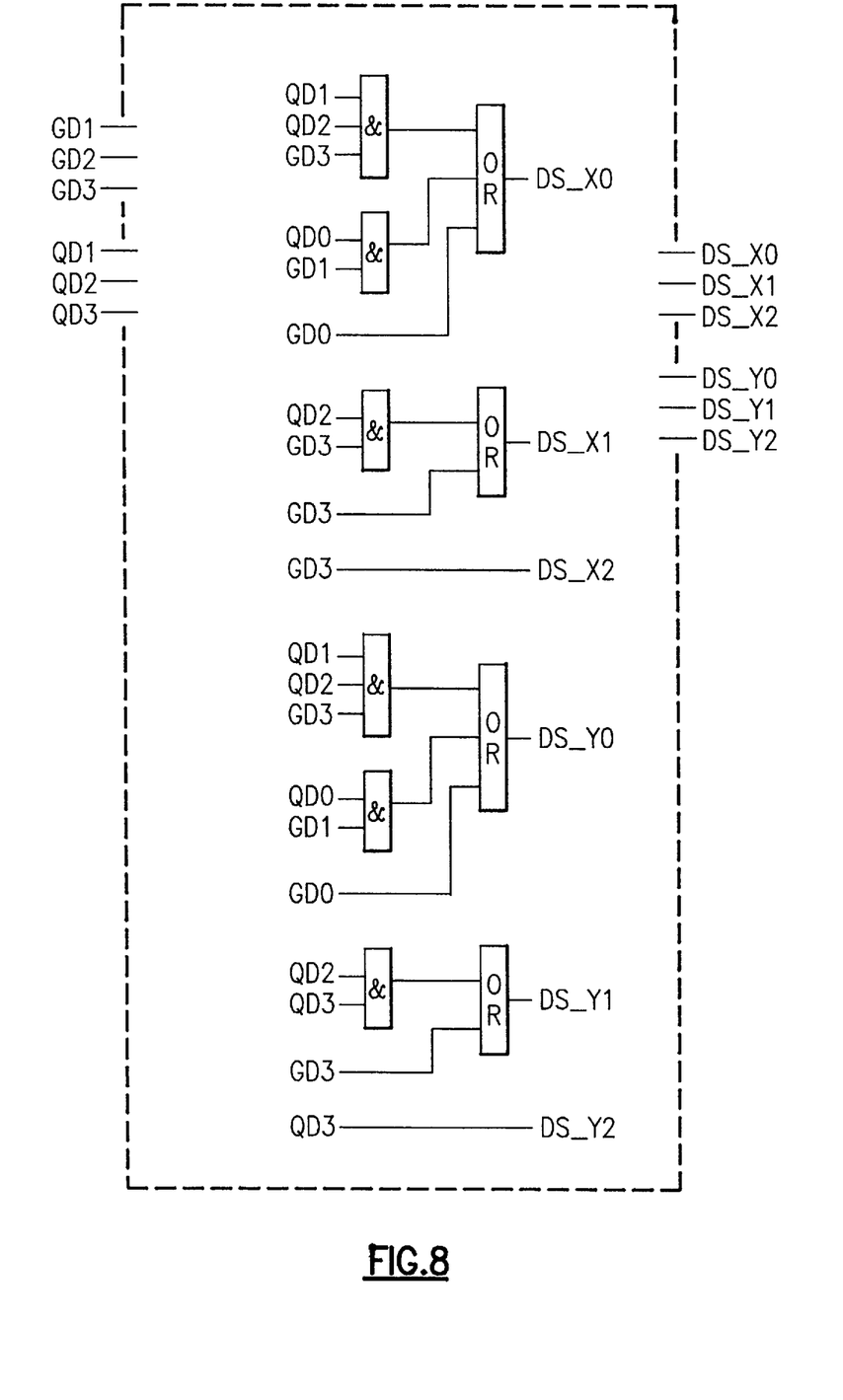
FIG. 8 shows a digit pre-select block of FIG. 6.

$ZDXJ=ZDX0 . ZDX1 . ZDX2 . ZDX3$ $ZDXK=ZDX0 . ZDX1 . \bar{\,}(ZDX2 . ZDX3)$ $ZDXL=ZDX0 .\bar{\,}ZDX1+ZDX0 . ZDX2 .\bar{\,}ZDX3$ $ZDYJ=ZDY0 . ZDY1 . ZDY2 . ZDY3$ $ZDYK=ZDY0 . ZDY1 . \bar{\,}(ZDY2 . ZDY3)$ $ZDYL=ZDY0 .\bar{\,}ZDY1+ZDY0 . ZDY2 .\bar{\,}ZDY3$ FIG. 8 shows the Digit Preselect block. It has the Generate inputs GD1, GD2, GD3 and the Prop-Generate Inputs QD1, QD2, QD3, as well as the Digit Select Outputs DS_X0, DS_X1, DS_X2 (for the case CI_B=0) and DS_Y0, DS_Y1, DS_Y2 (for the case CI_B=1). The Boolean equations are:

$DS\_X0=GD1+QD1.GD2+QD1.QD2.GD3$ $DS\_X1=GD2+QD2.GD3$ $DS\_X2=GD3$ $DS\_Y0=GD1+QD1.GD2+QD1.QD2.QD3$ $DS\_Y1=GD2+QD2.QD3$ $DS\_Y2=QD3$

This logic connection is realisable in 2 logic steps.

We claim:

1. An apparatus for determining the leading zero digits (ZDC) of a sum (S) substantially within approximately the same period of time as the determination of the sum (S), characterised by:

means (30) for parallel determining partial sums of single digits under consideration of possible carries;

means (40) for pre-determining potential zero digits, starting from the partial sums;

means (50) for selecting the potential zero digits when the correct value of a respective partial sum has been established;

means (70) for assessing the leading zero digits of the sum from the selected zero digits.

2. An apparatus according to claim 1, characterised by
means (20) for parallel determining partial sums of a plurality of digits under consideration of possible carries;
means (20) for pre-determining potential leading zero digits (ZDX, ZDY), starting from the partial sums of the plurality of digits;
means (150) for selecting the potential leading zero digits when the correct value of a respective partial sum of the plurality of digits has been established;
means (170) for assessing the leading zero digits of the sum from the selected potential leading zero digits.

3. An apparatus for determining zero digits in a sum (S) received from operands (A, B) to be added with one another, whereby the sum (S) is built up by means of a plurality of parallel adders (30A, 30B. 30C) respectively adding partial operands (A0, A1, A2 and B0, B1, B2) of the operands (A, B) to be added to partial sums (S0, S1, S2), whereby each one of the adders (30A, 30B, 30C) respectively adds at least one of the digits of the operands (A, B) in the same digit position, and whereby the adder (30A) for the lowest significance digit has as an output a corresponding partial sum (S0), and adders (30B, 30C) for higher significance digits have as an output both a corresponding partial sum (S1, S2) and the corresponding partial sum (S1+1, S2+1) considering a possible carry, characterised by
a plurality of zero-digit-recognising means (40), respectively coupled each with one output of the plurality of adders (30), for recognising whether the respective partial sum at that output represents a zero digit;
a plurality of selectors (50B, 50C), respectively coupled with the outputs of said zero-digit-recognising means (40B0, 40B1, 40C0, 40C1) which are respectively coupled with one of the adders (30B, 30C) for higher significance digits, for selecting whether the determined partial sum with (S1+1, S2+1) or without (S1, S2) consideration of a carry is to be used as correct partial sum for the determination of the zero digits;
a selection means (60) for controlling the plurality of selectors (50) for the selection of each of the correct partial sums;
a count decoding logic (70), coupled to the output of the zero-digit-recognising means (40A) of the lowest significance digit and to the outputs of the selectors (50) of the higher significance digits, for determining the number of leading zero digits (ZDC) of the sum (S).

4. An apparatus according to claim 3, wherein the adder (30A) of the least significant digit (30A) outputs both the respective partial sum (S0) and the respective partial sum (S0+1) taking into account a possible carry over, characterised in that the device is further provided with:
a further zero digit recognition means (40A1), coupled with the output of the adder (30A) of the least significant digit taking into account a possible carry (C);
a further selector (50A) coupled with the outputs of the zero-digit recognition means (40A0, 40A1) which are coupled with the adder (30A) of the least significant digit;
the count decoding logic (70) being coupled with the outputs of all selectors (50).

5. An adder (20), characterised by an apparatus according to claim 3 (FIG. 2).

6. An adder (20), characterised by an apparatus according to claim 4 (FIG. 3).

7. An apparatus for determining leading zero digits of a sum (S) of operands (A, B) to be added with one another, the operands (A, B) being divided into a plurality of partial operands (A(0), B(0), A(1), B(1), A(2), B(2)) representing digits of the operands (A, B) characterised by:
an adder (20) according to claim 5 for adding the lowest significance partial operands (A(0), B(0));
a plurality of pairs of second adders (20) according to claim 5 wherein said second adders further include an apparatus wherein the adder (30A) of the least significant digit outputs both the respective partial sum (S0) and the respective partial sum (S0+1) taking into account a possible carry over and wherein said second adders further include a further zero digit recognition means (40A1) coupled with the output of the adder (30A) of the least significant digit taking into account a possible carry (C), a further selector (50A) coupled with the outputs of the zero digit recognition means (40A0, 40A1) which are coupled with the outputs of the adder (30A) of the least significant digit, and wherein the count decoding logic (70) is coupled to the output of all selectors (50), said second adders for adding the highest significance partial operands (A(1), B(1), A(2), B(2)), one of said second adders of each pair receiving an overflow as input;
a plurality of selectors (150), each coupled with the outputs of one of the pairs of second adders (20) respectively, for selecting whether the number of leading zero digits of the partial operands with or without consideration of a carry respectively is to be used for the determination of the leading zero digits of the sum (S);
a selection means (160) for controlling the plurality of selectors (150); and
a total count decoding logic (170), coupled to an output of the adder (20) of the partial operands (A(0), B(0)) of the lowest significance digit, representing the number of leading zero digits (ZDC(0)) of the partial sum of the lowest significance partial operands (A(0), B(0)), and also coupled to outputs of the plurality of selectors (150) respectively representing the number of leading zero digits (ZDC(0)) of the respective partial sum of the higher significance partial operands (A(1), B(1), A(2), B(2)), for determining the number of leading zero digits (ZDC) of the sum (S).

8. A device according to claim 7 characterised in that said adder for adding the least significant partial operands (A(0), B(0)) is provided with at least one of said second pairs of adders (20), one adder of said second pair receiving an overflow as an input, and with another selector (150) which is coupled with the outputs of the second pair of adders (20).

9. An adder, characterized by a device in accordance with claim 8.

10. An adder according to claim 9, characterised by a plurality of adders in higher hierarchical steps, each adder in the higher hierarchical step respectively comprising a plurality of adders of the next lower hierarchical step.

11. A floating point computing unit comprising an adder according to claim 1.

12. A data processing unit comprising a floating point computing unit according to claim 11.

13. A method for determining zero digits of a sum (S) resulting from operands (A, B) to be added with one another, the sum (S) being made in an adder (20) comprising a plurality of parallel adders (30A, 30B, 30C) respectively adding partial operands (A0, A1, A2 and B0, B1, B2) of the operands (A, B) to be added with one another to partial sums (S0, S1, S2), each one of the adders (30A, 30B, 30C)

respectively adding one of the digits of the operands (A, B) at the same digit position each, and the adder (30A) of the lowest significant digit having as an output a corresponding partial sum (S0), and optionally also the corresponding partial sum (S0+1) taking into account a possible carry, and adders (30B, 30C) of higher significance digits having as an output both a corresponding partial sum (S1, S2) and the corresponding partial sum (S1+1, S2+1) taking into account the respective carry, the method being characterised by the following steps:

recognising whether the respective partial sum at each one of the outputs represents a zero digit;

selecting whether the determined partial sum with (S0+1, S1+1, S2+1) or without (S0, S1, S2) taking into account a respective carry is the correct partial sum to be used for the determination of the zero digits;

determining the number of leading zero digits (ZDC) of the sum (S) from the selected and recognised zero digits.

14. Method according to claim 13, characterised in that the steps of selecting and determining are provided each with steps of pre-selecting and pre-determining potential leading zero digits and with steps of finally selecting and finally determining the leading zero digits.

15. Use of the method of claim 13 in adders for determining the leading zero digits substantially at the same time with the determination of the sum.

16. Use of the method according to claim 13 in floating point computing units.

17. Use of the method according to claim 13 in data professing units.

* * * * *